Dec. 7, 1965 H. KRAKLAU, JR 3,221,841
CAM OPERATED, AXIALLY MOVABLE BRAKE
Filed Jan. 27, 1964 2 Sheets-Sheet 1
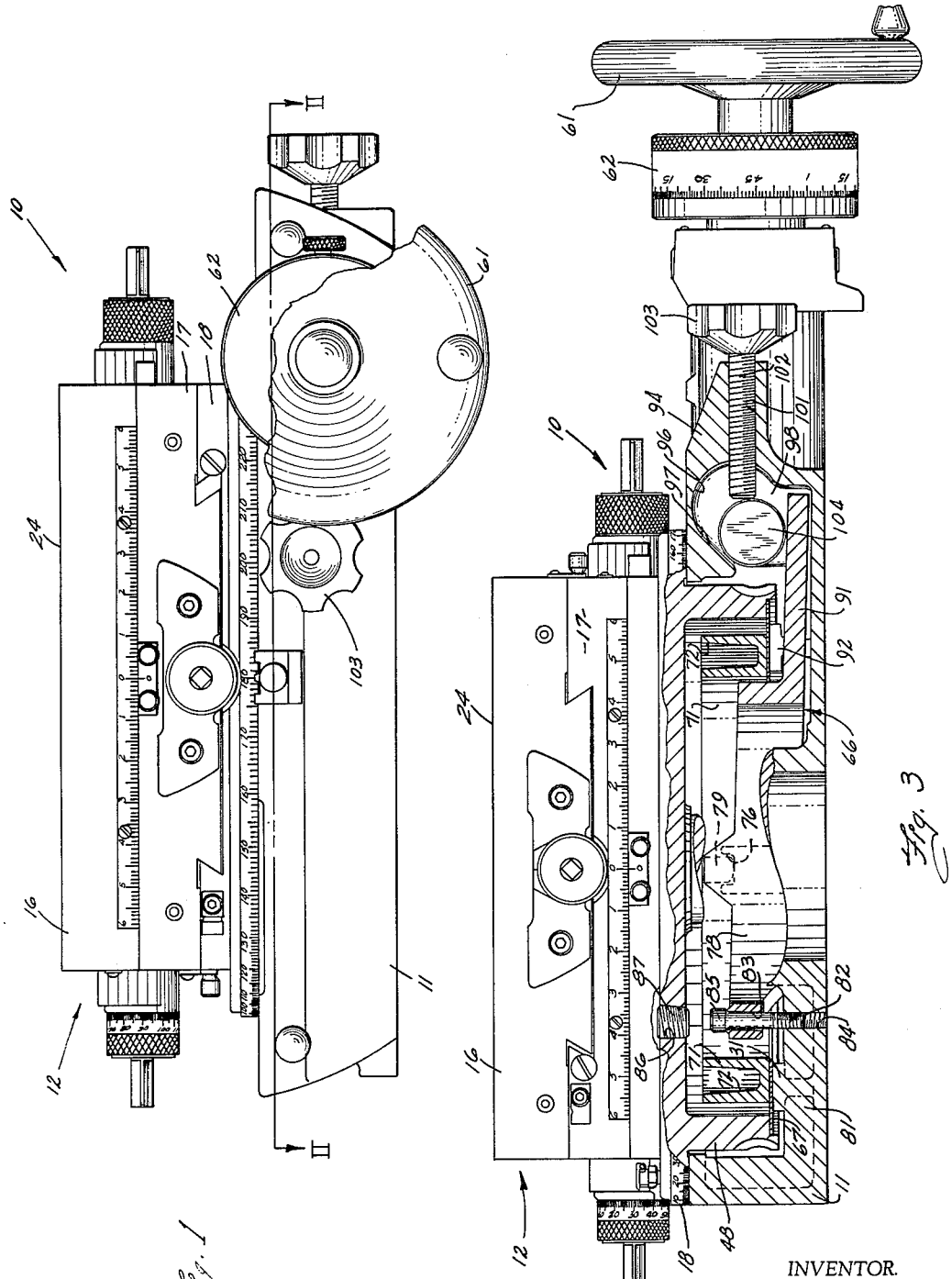
INVENTOR.
HENRY KRAKLAU, JR.
BY
Woodhams, Blanchard & Flynn
ATTORNEYS INVENTOR.
HENRY KRAKLAU, JR.
BY
Woodhams, Blanchard & Flynn
ATTORNEYS United States Patent Office 3,221,841
Patented Dec. 7, 1965

3,221,841
CAM OPERATED, AXIALLY MOVABLE BRAKE
Henry Kraklau, Jr., St. Joseph Township, Berrien County, Mich., assignor to Advance Products Corporation, Benton Harbor, Mich., a corporation of Michigan
Filed Jan. 27, 1964, Ser. No. 340,266
3 Claims. (Cl. 188—72)

This invention relates in general to a cross slide rotary table for supporting and accurately positioning an article upon which an operation is to be performed and, more particularly, to a lock mechanism for positively opposing and substantially preventing relative rotation between the article supporting platform and the base upon which it is mounted.

Cross slide rotary tables are well known and widely used, particularly in machine shops, for holding a workpiece, such as a die, mold, or the like, upon the bed of a machine tool, such as a milling machine, while the machine is caused to perform an operation upon the workpiece. A cross slide rotary table of this general type is disclosed in Patent No. 2,957,362, which is assigned to the assignee of this application.

Where accurate machining is required, the workpiece, hence the work supporting platform, must be held in a fixed position during the machining operation. Heretofore, manufacturers and users of cross slide rotary tables have encountered considerable problems with existing lock mechanisms intended to prevent relative rotation between the work supporting platform and the base upon which said platform is rotatably mounted. That is, existing lock mechanisms for this purpose have not been capable of both simple operation and positive locking action, without impeding the rotary movement of the table when it is in the unlocked position. A completely satisfactory table of this type must be capable of easy, 360° rotation and locking at any position in said rotation.

The existing lock mechanisms, with which I am familiar, are arranged and constructed so that they usually deflect the workpiece or force together a pair of bearing or working surfaces, both with undesirable results. That is, the operation of some existing lock mechanisms effects a relative movement between the workpiece and the base structure of the table assembly which reduces the accuracy of the assembly. In other cases, the operation of the lock mechanism forces together a pair of carefully prepared surfaces which are intended to provide smooth, relative movement between one part of the table assembly and another part supported thereon with a minimum of frictional loss when the lock mechanism is inoperative. This arrangement subjects the bearing surfaces to damage, whereby the performance of the machine may be impaired.

Accordingly, a primary object of this invention has been the provision of an improved cross slide rotary table having a lock mechanism capable of quickly, easily and positively locking the work supporting platform with respect to the base upon which said platform is rotatably supported.

A further object of this invention has been the provision of a rotary table having a lock mechanism, as aforesaid, which is sturdy in construction, positive and foolproof in its operation, which is capable of long, continuous and trouble free operation, which is capable of adjustment to compensate for variations in individual rotary table constructions and which requires an absolute minimum of maintenance.

A further object of this invention has been the provision of a lock mechanism, as aforesaid, which requires relatively few working parts, which, when adjusted, will remain in adjustment, and which can be adapted for use in a wide variety of cross slide rotary tables.

Other objects and purposes of this invention will become apparent to persons familiar with this type of equipment upon reading the following descriptive material and examining the accompanying drawings, in which:

FIGURE 1 is a broken, side elevational view of a cross slide rotary table embodying the lock mechanism of the invention.

FIGURE 3 is a broken sectional view, substantially as taken along the line III—III in FIGURE 2.

Figure 4:
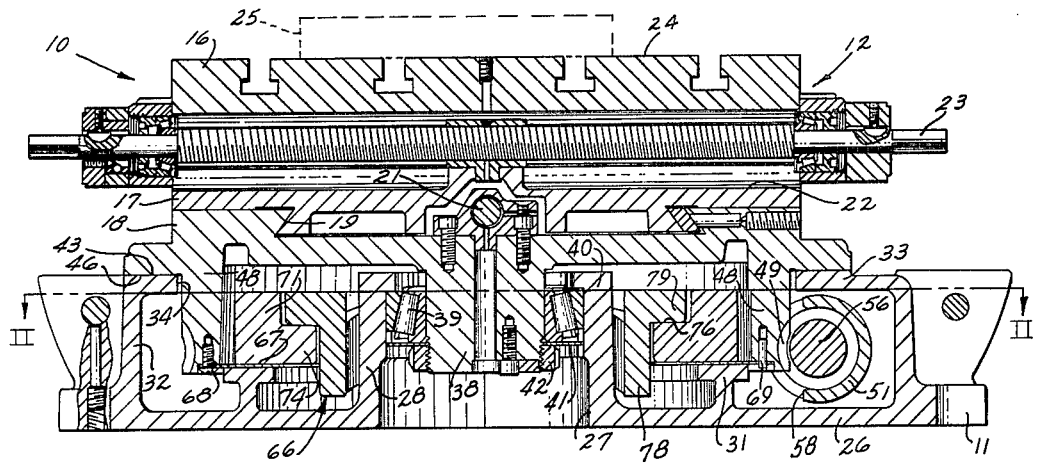
FIGURE 4 is a sectional view substantially as taken along the line IV—IV in FIGURE 2.

For convenience in description, the terms "upper," "lower" and words of similar import will have reference to the cross slide rotary table as appearing in FIGURES 1, 3 and 4. The terms "front" and "rear" will have reference to the right and left ends, respectively, of the cross slide rotary table as appearing in FIGURE 3. The terms "inner," "outer" and derivatives thereof will have reference to the geometric center of said cross slide rotary table and parts thereof.

GENERAL CONSTRUCTION

The objects and purposes of this invention, including those set forth above, have been met by providing a cross slide rotary table including a table assembly having a pair of cross slides rotatably mounted upon a base structure so that a workpiece supported upon the table assembly can be moved into an infinite variety of positions within a given zone parallel with a plane perpendicular to the rotational axis of the table assembly. A lock mechanism is located within the base structure and is connected to a manually engageable device mounted upon the outside of the base structure for positively locking the table assembly against rotation with respect to the base structure. This lock mechanism is arranged and constructed so that it does not obstruct the rotational movement of the table assembly with respect to the base structure when said lock mechanism is in its unlocked position.

DETAILED DESCRIPTION

Briefly, the cross slide rotary table 10 embodying the invention includes a base structure 11 (FIGURES 1, 2, and 4) and a table assembly 12 which is rotatably supported upon said base structure 11.

The table assembly 12 (FIGURE 4), comprises an upper or platform member 16, an intermediate member 17 and a lower or rotary member 18. The intermediate member 17 is slidably supported upon the lower member 18 for horizontal movement with respect thereto along guideways 19 thereon. A threaded shaft 21 is rotatably supported on said intermediate member 17 and threadedly engages the lower member 18 for effecting such movement of said intermediate member 17.

In a similar manner, the upper member 16 is slidably supported in guideways 22 on the intermediate member 17 for horizontal movement in a direction perpendicular to the direction of movement of said intermediate member 17. Said upper member 16 rotatably supports a threaded shaft 23 which threadedly engages said intermediate member 17 for moving said upper member thereon.

The upper member 16 has an upper surface or platform 24 upon which a suitable workpiece 25 may be held in any convenient manner. The upper and intermediate members 16 and 17 are of substantially conventional construction and need not be further described. Insofar as the invention is concerned, said upper and intermediate members 16 and 17 may be omitted or may be replaced with such other workpiece engaging devices as may be desired.

The base structure 11 (FIGURE 4) includes a bottom wall 26 having a substantially central opening 27 therethrough, and a substantially cylindrical, hollow and upstanding pedestal 28 integral with said bottom wall 26 and encircling said opening 27. A generally T-shaped annular flange 31, which is upstanding from and preferably integral with the bottom wall 26, is radially spaced from and coaxial with the pedestal 28. An upstanding peripheral wall 32 is integral with the bottom wall 26 and is spaced radially outwardly from the upstanding flange 31. The pedestal 28 and peripheral wall 32 extend substantially above the upstanding flange 31. A substantially planar flange 33 is preferably integral with and extends radially inwardly from the top of the peripheral wall 32, and its radially inner edge defines a circular opening 34 coaxial with and radially spaced from the pedestal 28.

The lower or rotary member 18 (FIGURE 4) of the table assembly 12 includes an integral, centrally located and depending hub 38 which extends into the upper end of the hollow pedestal 28. Suitable, radial bearing means, such as the roller bearing 39 is located within the pedestal 28 and supported upon the hub 38 by a retainer 41 which is mounted on the lower end of the hub 38 by a nut 42. The bearing 39 is disposed beneath an inwardly extending flange 40 on the upper end of the pedestal 28 so that the hub 38, hence the rotary member 18, can rotate but cannot move upwardly with respect to the base structure 11. The upper surface 43 of the flange 33 and the downwardly facing surface 46 of the rotary member 18 adjacent its perimeter are preferably planar and engaged to support the lower member 18 upon the base structure 11 for rotation with respect thereto.

A depending, cylindrical flange 48 is coaxial and preferably integral with the rotary member 18 adjacent and radially inwardly of the thrust bearing surface 46, and it extends through the opening 34 in the top of the base structure 11. The depending flange 48 has gear teeth 49 cut in its outer periphery to form a worm gear.

An elongated, generally cylindrical worm case 51 (FIGURES 2 and 4) includes spaced and coaxial bearings 52 and 53 rotatably supporting an elongated worm shaft 56. A worm 57 is integral with the worm shaft 56 adjacent an opening 58 in the circumferential wall of the worm case 51. The worm case 51 is held with respect to the base structure 11 by any convenient means, not shown, so that the worm 57 may operatively engage the gear teeth 49 through the opening 58. Thus, the worm shaft 56 is tangentially arranged with respect to the depending flange 48. The worm shaft 56 has a manually engageable handwheel 61 (FIGURE 3) and position indicator 62 whereby rotation of handwheel 61 causes a corresponding rotation of the rotary member 18 about the axis of the bearing 39.

The lock mechanism, generally indicated at 66 in FIGURE 4, includes at least one friction plate 67 which is connected by means of screws 68 and locating pins 69 to the lower end of the depending flange 48. The friction plate 67 extends radially inwardly from the depending flange 48 and overlaps at least part of the upstanding flange 31 on the base structure 11. The radially inner portion of the friction plate 67 lies closely adjacent to the top surface of the upstanding flange 31 but is preferably slightly spaced therefrom to eliminate obstructions thereby to the movement of the rotary member 18. The friction plate 67 is preferably, although not necessarily, constructed as a ring concentric with the depending flange 48 and therefore with the upstanding flange 31.

An annular clamping member 71 (FIGURE 4) which is located near to and inwardly of the depending flange 48, is supported upon the friction plate 67 above the upstanding flange 31. The upper face of the clamping member 71 may be relieved, as indicated at 72 in FIGURES 2 and 3, to reduce the weight thereof. The clamping member 71 has a pair of diametrically opposed, inwardly extending ears 74 including coaxial, semi-cylindrical and upwardly opening grooves 76.

An essentially annular actuating or lever member 78 lies radially within the clamping member 71 and is pivotally supported thereon by a pair of integral, diametrically disposed and outwardly extending lugs 79, which are pivotally supported in the grooves 76 on the clamping member 71. The base structure 11 (FIGURES 2 and 3) has radially disposed an upstanding rib 81 which extends under the actuating member 78 midway between the lugs 79. An upstanding, adjustment bolt 82 is slidably and loosely received through an opening 83 in the actuating member 78 and the lower end of the adjustment bolt 82 is threadably received into a threaded hole 84 in the rib 81. Contact between the head 85 of the bolt 82 and the adjacent portion of the actuating member 78 limits pivotal movement of the actuating member 78 around the lugs 79 in a clockwise direction, as seen in FIGURE 3. A threaded access hole 86 normally closed by a threaded plug 87, extends through the rotary member 18 in line with the bolt 82 to permit vertical adjustment of said bolt head, hence the pivotal movement of the lever member 78. A lever arm 91 is preferably integral with the actuating member 78 and extends radially outwardly therefrom at a point essentially diametrically opposite the opening 83. The lever arm 91 is located adjacent the lower edge of the actuating member 78, and passes under the clamping member 71, under the friction plate 67 and through a suitable slot 92 in the upstanding flange 31 of the base member 11. Thus the actuating member 78 and, accordingly, the clamping member 71 are prevented from rotating with the friction plate 67 and lower member 18 by the confinement of the lever arm 91 within the slot 92.

Figure 2:
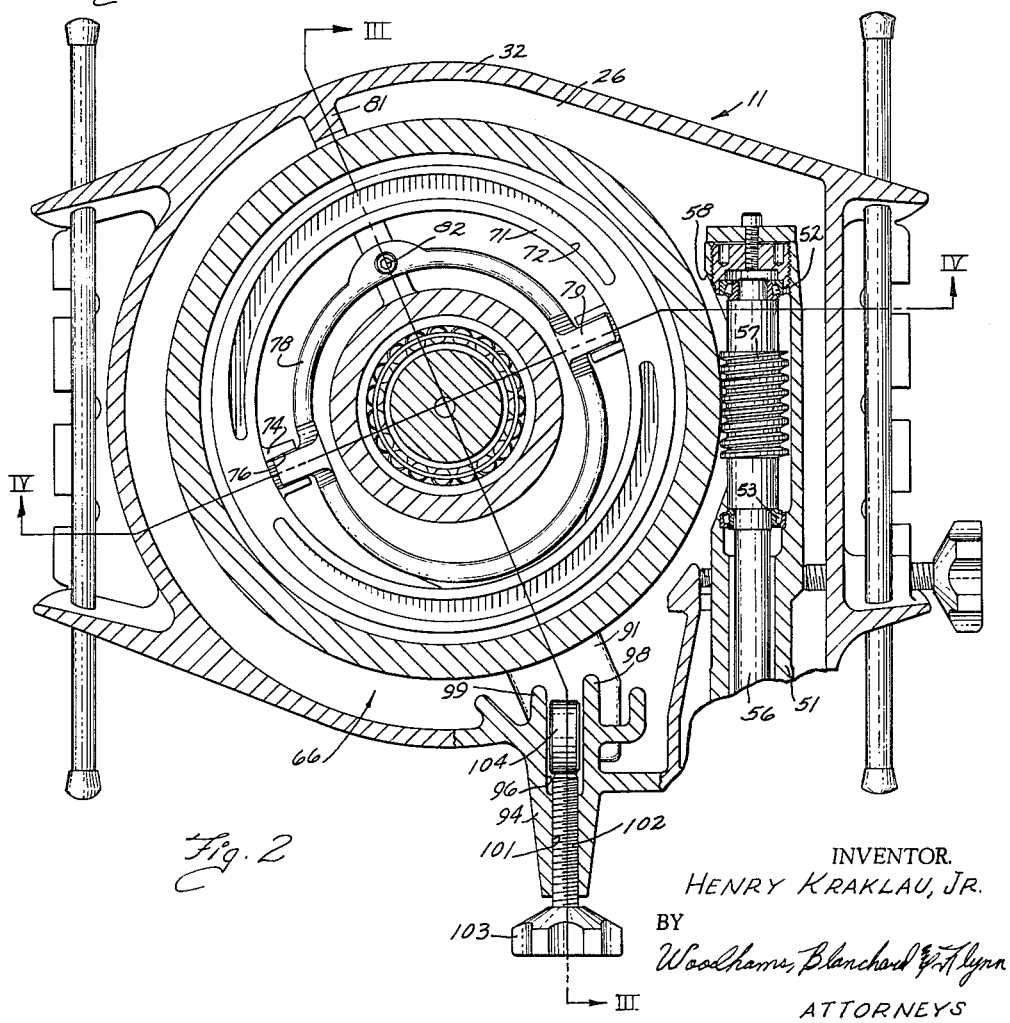
FIGURE 2 is a sectional view substantially as taken along the line II—II in FIGURES 1 and 4, with parts thereof broken away.

A preferably integral boss 94 (FIGURE 3) extends forwardly from the peripheral wall 32 of the base structure 11 in line with the lever arm 91. An upwardly and forwardly extending recess 96 extends from the base member 11 above the lever arm 91 into the boss 94. The recess 96 has an upwardly and forwardly sloped upper wall 97 flanked by a pair of upstanding and parallel sidewalls 98 and 99 (FIGURE 2).

A threaded opening 101 (FIGURE 3) extends forwardly through the boss 94 from a point in the recess 96 above the level of the lever arm 91. A threaded rod 102 having a knob 103 on the outer end thereof is threadedly received into the opening 101 and extends into the recess 96. A roller 104 lies within the recess 96 with its axial ends snugly but slidably disposed between the sidewalls 98 and 99 of said recess 96. The peripheral surface of the roller 104 rests upon the lever arm 91 near its outer end and engages the sloped wall 97 of recess 96 and the inner end of the rod 102. The points of contact with the wall 97 and rod 102 are spaced so that an inward or rearward movement of the threaded rod 102 causes the roller 104 to move inwardly and downwardly along the wall 97, thereby forcing the outer end of the lever arm 91 downwardly.

OPERATION

The operation of the upper member 16 and intermediate member 17 of the table assembly 12 is substantially conventional and need not be further discussed, particularly since it is probably evident from the foregoing description.

When the lock mechanism 66 (FIGURE 4) is disengaged, the rotary member 18 can be rotated with respect to the base structure 11 by rotating the worm 57 which engages and moves the teeth 49 on the flange 48. Radial thrust forces between the rotary member 18 and the base structure 11 are absorbed by the bearing 39, which also prevents upward movement of the rotary member 18 with respect to the base structure 11. The upper surface 43 on the base structure 11 engages the lower surface 46 on the rotary member 18 to support same.

The friction plate 67 is located with respect to the upstanding flange 31 of the base member 11 so that contact therebetween is minimized when the lock mechanism 66 is inoperative. The clamping member 71, the actuating member 78 and the roller 104 are directly or indirectly supported at least in part by the friction plate 67, hence by the lower member 18 to which the plate 67 is secured. The members 71 and 79 could be resiliently and independently supported, by means not shown, upon the base structure 11 to minimize frictional losses when the lock mechanism is inoperative. However, the weight of the members 71 and 79 is so small by comparison with the clamping force imposed on the friction plate 67 when the lock mechanism 66 is energized in the manner described hereinbelow, that such weight can be ignored.

The lock mechanism 66 is energized by manually rotating the knob 103 so that it effects inward movement of the threaded rod 102, hence inward movement of the roller 104 which is engageable with the sloped upper surface 97 in the recess 96. Accordingly, inward movement of the roller 104 effects a downward movement of the outer end of the lever arm 91, whereby the actuating member 78 is pivoted in a clockwise direction (FIGURE 3), first around the axis defined by the lugs 79, and later around the point of contact between the member 78 and the bolt head 85. The actuating member 78 operates through the lugs 79 and ears 74 to force the clamping member downwardly against the friction plate 67, which is sufficiently flexible to be urged downwardly by said clamping member into tight engagement with the upper surface of the flange 31. The amount of the movement required to bring the lower surface of the friction plate 67 into contact with the upper surface of the flange 31 may be relatively small and in fact may be almost negligible, depending upon the adjustment of the bolt 82 in the threaded hole 84. The diametrical location of the lugs 79 and the ears 74 causes the clamping member 71 to press the friction plate 67 against the upper face of the upstanding flange 31 in a direction substantially perpendicular thereto, hence, with a substantially uniform force along the entire upper surface thereof. Thus, a relatively small amount of torque applied to the knob 103 will cause the friction plate 67 to engage the upstanding flange 31 with sufficient force to prevent the rotation of the rotary member 18 by either intentional or inadvertent rotation of the handle 61, or by applying other exterior forces to the rotary member 18. In this manner the table assembly 12 is locked in any desired rotational position with respect to the base structure 11.

Since the point of contact between head 85 of the bolt 82 and the adjacent portion of the actuating member 78 is on about the same horizontal level as the point of contact between the lugs 79 and grooves 76, the movement of the clamping member 71 by the actuating member 78 will be primarily vertical and will have a negligible horizontal component. Thus, sliding of the clamping member 71 upon the surface of the friction plate 67 will be negligible. Moreover, the lock mechanism 66 can be operated without deflecting any of the upper members of the table assembly 10 with respect to the base structure 11, hence, without moving the workpiece 25 away from the location in which it was accurately positioned by operating the assembly 10 before the locking operation was performed. This is due, at least in part, to the fact that the friction plate 67 can be clamped between the flange 31 and the member 71 with a minimum of relative movement therebetween.

Also due to the close adjacency of these parts and/or the flexibility of the plate 67, said plate 67 creates very little or no resistance to such clamping movement. Furthermore, and for the same reason, the clamping action can occur without forcing any of the bearing or working surfaces together, which might otherwise damage them.

It will be noted that the actuating member 78 is horizontally positioned by the bolt 82 and the slot 92 in the standing flange 31. Thus, the contact between the grooves 76 and lugs 79 is sufficient to position the clamping member 71 horizontally with respect to the friction plate 67.

Although a particular preferred embodiment of the invention has been disclosed above for illustrative purposes, it will be understood that variations or modifications of such disclosure, which lie within the scope of the appended claims, are fully contemplated.

What is claimed is:

1. In a cross slide rotary table having a base member and a rotary member supported thereon for rotation around an upright axis, mechanism for releasably holding the rotary member against rotation with respect to the base member, comprising:
   substantially annular flange means substantially concentric with the rotational axis of said rotary member and extending upwardly from said base member toward said rotary member, said flange means having a radial opening and an upper surface defining a plane perpendicular to said axis;
   second flange means secured to said rotary member;
   friction plate means secured to and extending radially inwardly from said second flange means to a position above and adjacent the upper surface of said annular flange means;
   a clamping ring substantially concentric with said rotational axis and disposed above said annular flange means for engagement with said plate means;
   an annular lever member encircling said annular flange means and pivotally supported at diametrically opposite points upon said clamping ring for movement around a second axis, said lever member being pivotally connected to said base member for pivotal movement around a third axis substantially parallel with said second axis and passing through said lever member on one side of and spaced from said second axis, said lever member having a lever element secured thereto and projecting therefrom on the other side of said second axis from said third axis, said lever element extending through said radial opening;
   wall means on said base member spaced above said lever element, said wall means and said lever element having opposing surfaces converging toward said rotational axis;
   actuating means disposed between and simultaneously engageable with said converging surfaces for movement radially of said rotational axis; and
   control means connected to said base member and engageable with said actuating means for effecting movement thereof toward said rotational axis and thereby causing said lever member to urge said clamping ring toward said annular flange means, whereby said plate means is tightly gripped between said clamping ring and said annular flange means so that rotation of said rotary member with respect to said base member is positively opposed.

2. A mechanism according to claim 1, wherein said actuating means is a roller having an axis substantially parallel with said second axis; and
   wherein said control means comprises a manually engageable screw threadedly engaged with said base member and engageable with the peripheral surface of said roller for moving same toward said rotational axis in response to rotation of said screw.

3. The structure in claim 1 wherein said friction plate means is normally spaced a slight distance from said upper surface and is normally engaged by said clamping ring; and wherein said friction plate means is resiliently flexible so that it is moved against said upper surface by said clamping ring.

References Cited by the Examiner
UNITED STATES PATENTS

| | | | |
|---|---|---|---|
| 1,321,195 | 11/1919 | Farb | 74—99 X |
| 1,898,313 | 2/1933 | Robbins | 188—72 |
| 1,958,922 | 5/1934 | Milan | 188—72 |
| 2,130,785 | 9/1938 | Bergland | 188—72 |
| 2,304,368 | 12/1942 | Milan | 188—72 |
| 2,808,741 | 10/1957 | Bellmann | 74—824 |
| 2,959,988 | 11/1960 | Abrams | 90—58 |
| 3,139,160 | 6/1964 | Hink et al. | 188—72 X |

MILTON BUCHLER, *Primary Examiner.*

ARTHUR L. LA POINT, *Examiner.*